July 14, 1925.
S. J. DOOLEY
VALVE GUIDE
Filed Feb. 3, 1922
1,545,948
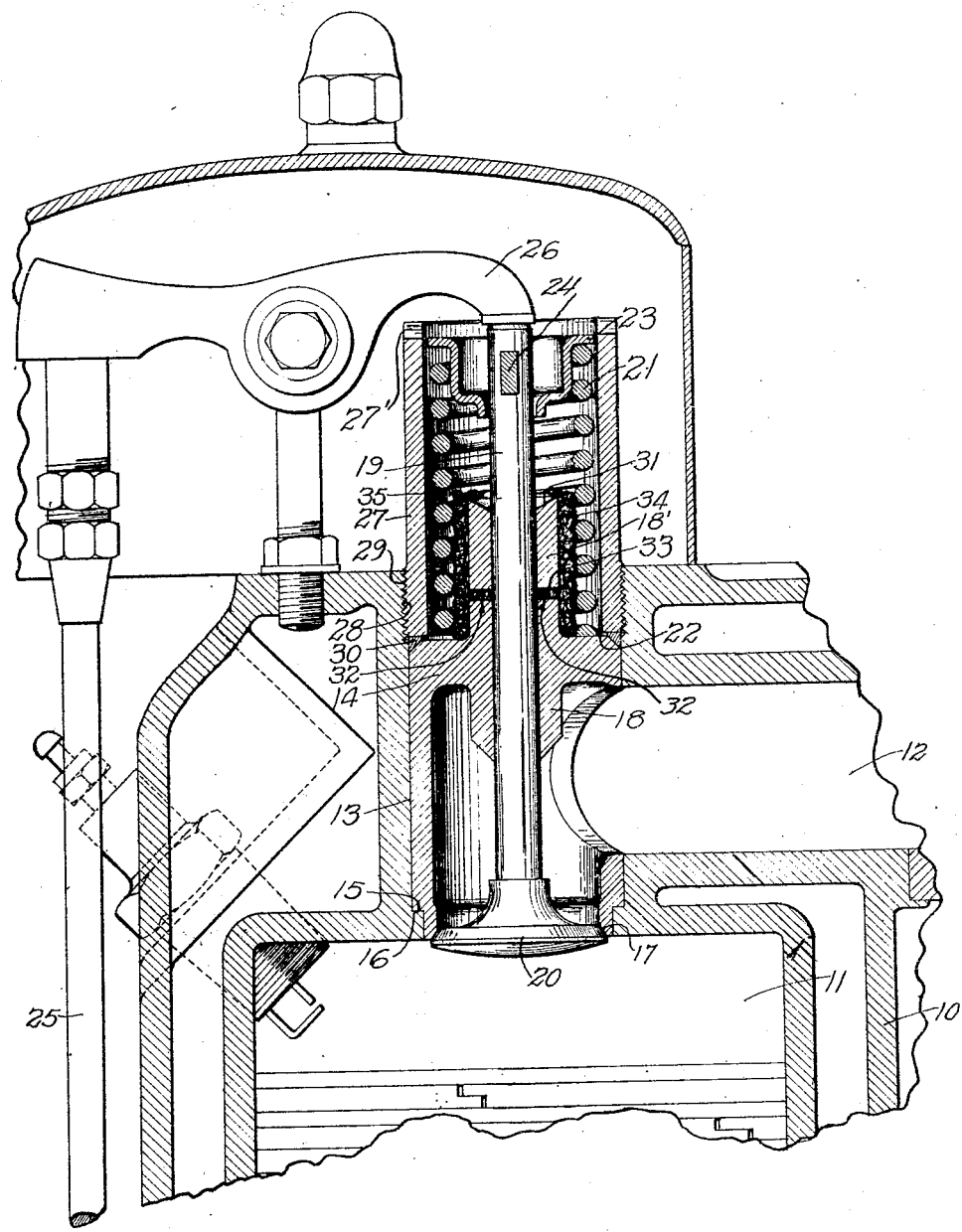
Inventor
Stephen J. Dooley
Williams Bradbury
By McCaleb & Pierce, ATTYS.

Patented July 14, 1925.

1,545,948

UNITED STATES PATENT OFFICE.

STEPHEN J. DOOLEY, OF CHICAGO, ILLINOIS.

VALVE GUIDE.

Application filed February 3, 1922. Serial No. 533,765.

*To all whom it may concern:*

Be it known that I, STEPHEN J. DOOLEY, a citizen of the United States, and resident of Chicago, in the county of Cook and State of Illinois, have invented a certain new and useful Improvement in Valve Guides, of which the following is a full, clear, concise, and exact description, reference being had to the accompanying drawing, forming a part of this specification.

My invention relates to valve guides, and more especially to guides for the overhead poppet type of valves, and has for its object the provision of improved means for lubricating valve guides of this type whereby a substantially even lubrication of the guide is maintained throughout its length and whereby this lubrication may be maintained without necessity of frequent attention. A further object of my invention is the provision of a construction which will accomplish the foregoing results and which may be applied to engines already in use with the necessity of but a small amount of alterations and a small number of additional parts.

As my invention can best be understood when illustrated by a specific embodiment, I shall proceed directly with the description of the accompanying drawing, which comprises such an embodiment. The drawing shows a transverse vertical section of the upper portion of the cylinder casting of an internal combustion engine of the valve-in-head type.

The cylinder casting 10 comprises the cylinder bore 11, exhaust port 12 and a vertical bore 13, communicating with the exhaust port and the cylinder bore. A valve cage 14 is supported within the bore 13, the position of the valve being limited downwardly by a shoulder 15 which co-operates with the flange 16 on the cylinder casting 10 adjacent the cylinder bore 11. Valve cage 14 comprises a valve seat 17 adjacent the head of the cylinder bore 11 and an integral valve guide 18 in which is reciprocably supported the stem 19 of a valve, the head 20 of which co-operates with the seat 17 of the valve cage.

The valve head 20 is normally closed against the seat 17 by the helical spring 21 which is interposed between the upper shoulder 22 of the valve cage and the cup washer 23 which is secured by a pin 24 to the upper end of the valve stem 19. Opening and closing of the valve head 20 is effected by any suitable means, such as the action of a push rod 25 through a rocker arm 26 to reciprocate the valve stem 19.

The valve cage 14 is secured against upward movement in the vertical bore 13 of the cylinder casting by an annular nut or sleeve 27 which is provided adjacent its lower edge with external threads 28 which co-operate with internal threads 29 in the cylinder casting 10 adjacent the upper margin of the bore 13. The sleeve 27 is provided with a plurality of notches 27′, which may be engaged by a spanner wrench for turning it. An oil-tight and gas-tight seal is made between the lower edge of the nut 27 and the shoulder 22 of the valve cage 14 by means of a gasket ring 30 of substantially triangular cross section. The sleeve nut 27 extends upwardly beyond its threads 28 a considerable distance, lying around the spring 21 and the portion 18′ of the valve guide 18 which extends upwardly beyond the shoulder 22 of the valve cage.

The upper end of the valve guide 18′ is dished, being provided with an inwardly converging conical surface 31, while adjacent the shoulder 22 the guide is provided with a plurality of ducts 32 which lead from the exterior of the guide to its valve stem supporting bore. These ducts 32 I prefer to fill with oil absorbent wicks 33 of such a material as felt, while around the upper portion 18′ of the valve guide and within the inner diameter of the spring 21, I provide a sleeve 34 of similar oil absorbent material, which preferably extends a small distance above the upper margin of the dished end 31 of the valve guide.

As shown in the drawings, the sleeve 27 forms the lateral walls of a reservoir 35, which has as its bottom closure the upper shoulder 22 of the valve cage. In operation, this reservoir 35 is filled with lubricant to any desired level, which may be as high as the bottom of the notches 27′. So long as the lubricant is above the top of the felt sleeve 34, it will flow into the cup end 31 of the valve guide and work its way downwardly along the bore of the valve guide both by gravity and the reciprocation of the valve stem 19. Another supply of oil is fed to the bore of the valve guide through the ducts 32, this flow being substantially restricted by the wicks 33 and the felt sleeve 34. As the lubricant is used up, the level will drop below the upper end of the valve guide 18', but lubricant will continue to be supplied to the bearing surfaces of the guide through the ducts 32 as the felt sleeve 34 and the wicks 33 will continue through capillary action to feed the oil substantially so long as any lubricant remains in the bottom of the reservoir 35. It is also to be noted that as the sleeve 34 extends upwardly beyond the upper margin of the dished end 31 of the valve guide that this sleeve will act as a wick in drawing oil upwardly over this peripheral margin, where it will gravitate downwardly to the center of the conical depression and supply lubricant to the upper end of the guide bore so long as any lubricant remains in the reservoir 35. I have found that, by using this construction in connection with the wicks 32 and the felt sleeve 34, a fairly even lubrication of the valve guide bore may be maintained regardless of the amount of lubricant in the reservoir 35.

It will be noted that the sleeve nut 27 is substantially similar to that type of sleeve nut customarily used in valve-in-head constructions, except that its annular wall is extended upwardly a greater distance than is customary, and it is also to be observed that the valve cage 14 is likewise of the usual type and construction. In commercial use, I contemplate that my invention may be embodied in engines already in use, substantially a minimum of the changes being necessary to adapt internal combustion engines of this construction to such an embodiment as here illustrated. It is contemplated that a sleeve, such as here described, will be substituted for the corresponding sleeve now in use, and that the valve cage 14 will be removed, the ducts 32 drilled therein and the cage then replaced, together with the wicks 33 and the felt sleeve 34.

While I have shown but one specific adaptation of my invention, it is to be clearly understood that I do not wish to limit myself thereby other than by the scope of the following claims.

What I claim is:

1. In an internal combustion engine, the combination of a cylinder member comprising a cylinder bore; an inwardly projecting flange on said member adjacent said bore; internal threads in said member spaced from said flange; a valve cage supported in said member and comprising a valve seat adjacent said bore, a shoulder co-operating with said flange to limit the position of said cage, a second shoulder adjacent said threads, and a valve guide, said guide extending longitudinally beyond said second shoulder in a direction away from said seat; a duct leading from the exterior to the interior surfaces of said guide; a hollow cylindrical nut surrounding a portion of said guide and provided with external threads which co-operate with said internal threads of said member, the lower edge of said nut engaging said second shoulder of the cage; a gasket between said edge and said shoulder; a valve comprising a head co-operating with said seat, and a stem reciprocably mounted in said guide; a spring co-operating with said stem to normally hold said head against said seat, a portion of said spring lying within said nut and around a portion of said guide; means for reciprocating said valve stem in said guide against the pressure of said spring, said nut and said guide each forming a portion of an oil reservoir; and means for feeding oil from said reservoir to the inner surfaces of said guide.

2. The combination with a cylinder of a valve cage comprising a valve seat and a longitudinal bore, a hollow cylindrical nut securing said valve cage in place relatively to said cylinder, the sides of said nut and the periphery of a portion of said cage forming the walls of a lubricant reservoir, said cage being provided with a duct communicating between said bore and said reservoir, a valve co-operating with said seat and having a stem reciprocably borne in said bore, and absorbent material lying about a portion of said cage for restricting the flow of oil from said reservoir to said bore.

3. The combination of a valve having a stem, a valve guide having a bore, said stem being reciprocably mounted in said bore, a member lying around the upper portion of said guide and forming a lubricant reservoir, the upper end of said valve guide being dished, and means for feeding oil from said reservoir to said bore over the cupped end of said valve guide.

4. The combination of an engine cylinder, a valve guide, a valve stem reciprocable within said guide, annular means for securing said guide relatively to said cylinder, said means forming a portion of a lubricant reservoir, the upper end of said guide projecting above the bottom of said reservoir and being dished, and means for feeding lubricant from said reservoir to said dished portion.

5. In a valve stem lubricating device for motors, the combination with a motor block having a bore with an internally threaded outer end portion, a valve cage positioned in the bore and having a valve seat at its lower end, a central valve stem bearing, and an annular gasket seat at its upper end adjacent the cylindrical bore and below said threaded portion, a gasket in said seat, a valve and stem operatively mounted in said valve cage, a spring interposed between the stem and the cage and adapted to normally hold the valve against the seat, and an attachable cylindrical reservoir surrounding and extended above the valve stem bearing and having an externally threaded portion adapted to engage said internally threaded portion of the bore by rotation of the reservoir, the lower end of said reservoir adapted to engage and compress said gasket in said seat to seal the lower end of the reservoir.

In witness whereof, I hereunto subscribe my name this 30th day of January, 1922.

STEPHEN J. DOOLEY.

Witnesses:
J. DAVID DICKINSON,
DAGMAR PETERSON.